July 17, 1956

C. C. WAUGH 2,754,683

TORQUEMETER

Filed Feb. 3, 1954

INVENTOR
Charles C. Waugh
BY
ATTORNEY.

July 17, 1956
C. C. WAUGH
2,754,683
TORQUEMETER
Filed Feb. 3, 1954
2 Sheets-Sheet 2
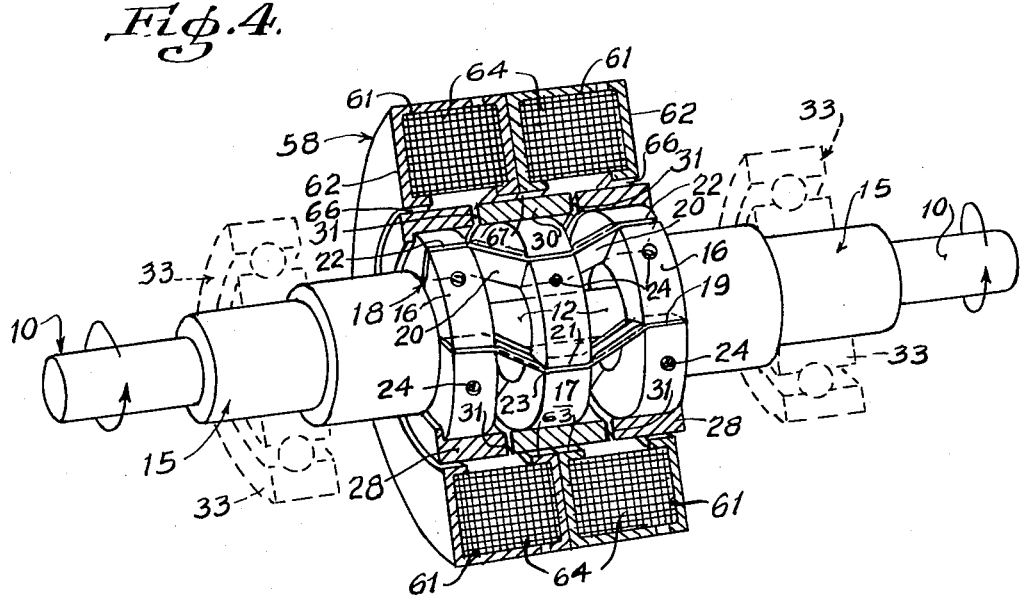
Fig. 4.
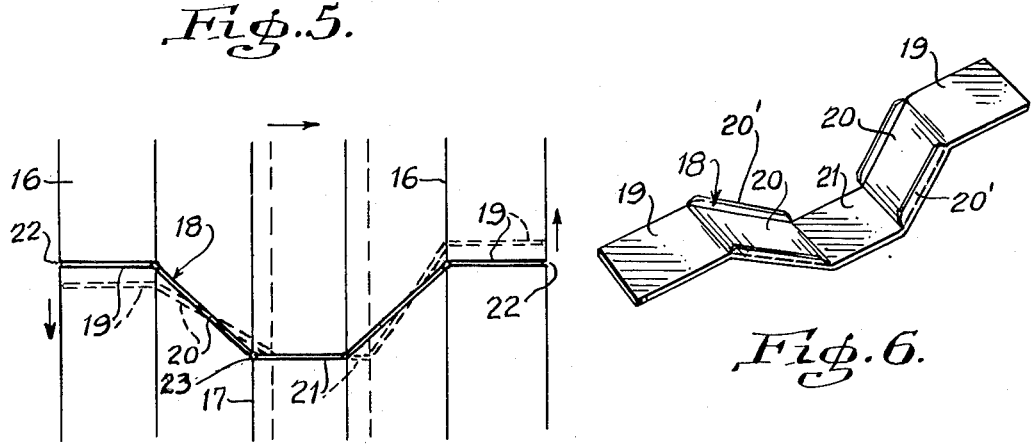
Fig. 5.
Fig. 6.
INVENTOR
Charles C. Waugh
BY
ATTORNEY.

United States Patent Office 2,754,683
Patented July 17, 1956

2,754,683

TORQUEMETER

Charles C. Waugh, Tarzana, Calif.

Application February 3, 1954, Serial No. 407,830

6 Claims. (Cl. 73—136)

This invention relates to a new and improved device for measuring the torsional moment in a shaft whether rotating or stationary.

My invention may be used as a torquemeter to measure the torque developed by rotating machinery such as gasoline engines, diesel engines, steam turbines, electric motors or gas turbines, and to measure the torque used to drive machines such as compressors, pumps or propellers.

In my copending application Serial 407,829, filed of even date herewith, now Patent 2,737,049, I have described and claimed one type of improved torquemeter. While the device of my said copending application operates satisfactorily, the instant invention constitutes an improvement over the torquemeter of said copending application.

It is an object of this invention to provide a torque measuring device which is simple, is composed of a minimum of component parts, is compact in size and is of rugged construction.

Another object is the provision of a torquemeter which will operate efficiently and dependably to measure a static or dynamic torque or torque at any speed or with the shaft stationary.

Other objects and advantages of the invention will be apparent from the following description of a preferred embodiment of my invention taken in connection with the accompanying drawings wherein:

Fig. 4 is an isometric view, shown partially in section, of a portion of the device of Fig. 1;

Fig. 5 is a schematic diagram of a component of the device of Fig. 1; and

Fig. 6 is a perspective view of such component.

Figure 1:
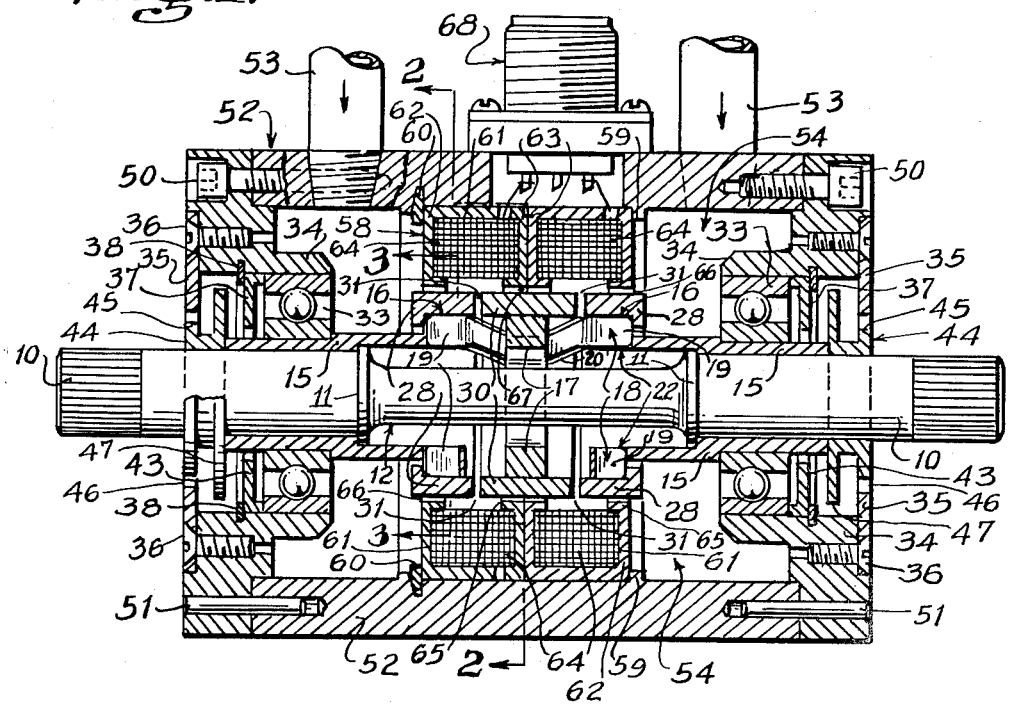
Fig. 1 is a vertical section of the device according to the invention, taken on line 1—1 of Fig. 2, certain parts being shown in full for clarity.
Figure 2:
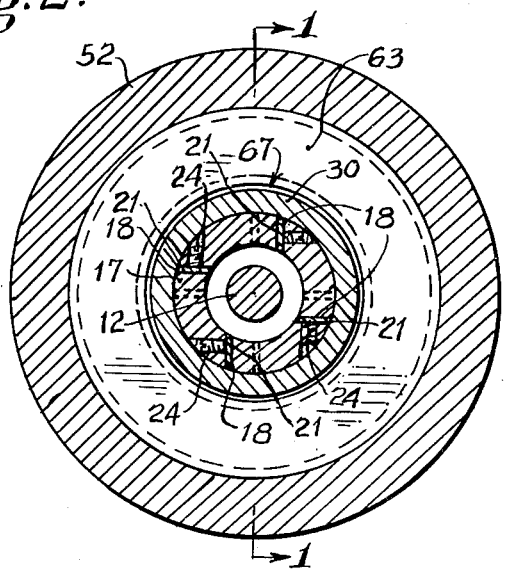
Fig. 2 is a vertical section taken on line 2—2 of Fig. 1.
Figure 3:
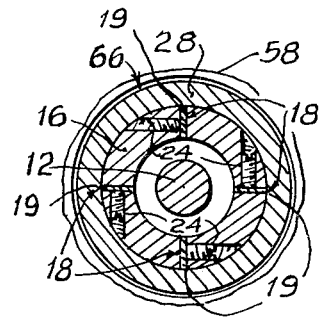
Fig. 3 is a vertical section taken on line 3—3 of Fig. 1.

Referring to the drawing, the torquemeter of this invention comprises a rotatable shaft 10 having a pair of spaced apart flanges 11 and an intermediate neck portion 12 between the flanges. Friction fitted by means of a press fit to shaft 10 and adjacent to flanges 11, for rotation with the shaft, is a pair of sleeves 15 extending laterally inward beyond flanges 11 extending over and spaced from the neck portion 12 of shaft 10. Each of sleeves 15 has at its inner end a flange 16 extending normal to and outwardly away from the axis of the shaft 10. The flanges 16 should be of a non-magnetic material.

As seen particularly in Figs. 1 and 4, numeral 17 represents a ring or annulus having substantially the same outer and inner diameter as flanges 16. The ring 17 is supported midway between these flanges in axial alignment therewith in a manner described below. The ring may be non-magnetic or of magnetic material. Four multiply bent flat springs 18 (see Fig. 6) are provided, each spring being bent to form two aligned end portions 19 of approximately equal length, such end portions being normally in the same plane, two inclined symmetrical intermediate portions 20 which are of substantially the same length and are disposed at an angle of about 45 degrees to the plane of end portions 19, and a mid-portion 21 located in a plane parallel to the plane of the end portions 19. End portions 19 of the spring have length approximately equal to the width of flanges 16 of the sleeves 15, and the mid-portion 21 of the spring has a length substantially equal to the width of ring 17. The lateral edge portions of 20 are bent upward into upstanding flanges 20'. Mid-portions 21 of the springs thus constitute stiff members which flex at their juncture with the portions 19 and 21. The flanges 20' are so positioned and designed that the section 20 is permitted limited torsional twist about a diagonal of the rectangular section of 20 but the bending of the portion 20 in a direction normal to the plane of 20 is localized adjacent the line of juncture with the portions 19 and 21. These localized areas of bending thus act as hinge points.

The spring should be of non-magnetic material, a suitable material being beryllium copper.

Equally spaced about the periphery of each of flanges 16 of sleeves 15 are four chordal slots 22, and equally disposed about the periphery of ring 17 are four chordal slots 23, all of the slots having a depth about equal to the width of spring 18, and the slots on the flanges 16 being parallel to the slots in ring 17. Sleeves 15 are positioned relative to each other so that the respective slots 22 in each of the flanges 16 are aligned directly opposite each other. The respective end portions 19 of each of the four springs 18 are disposed in the pairs of oppositely disposed aligned slots 22 about the periphery of the two flanges 16, and these end portions are retained in such slots by means of set screws 24. The mid-portion 21 of each of the springs 18 is disposed in one of the slots 23 of ring 17 and retained by similar set screws. Thus, it is seen that ring 17 is supported on the mid-portions 21 of the four springs 18, in turn supported at their respective end portions 19 by the adjacent flanges 16 of sleeves 15. As indicated in Fig. 4, the shape of springs 18 is such that when disposed in slots 22 and 23 as aforesaid, each of slots 23 in ring 17 is normally displaced angularly from the corresponding pair of opposed aligned slots 22 in flanges 16.

It will be observed from the description of the immediately foregoing structure that as the shaft 10 twists due to a torque applied to the shaft, springs 18 tend to twist and bend from their normal shape as seen in Fig. 6 into a shape wherein the intermediate portions 20 are disposed at different angles to the plane of the end portions 19 and the midportion 21 is displaced laterally. This is brought about due to the fact that sleeves 15 and their respective flanges 16 are always in a substantially fixed lateral position relative to each other. This ignores the theoretical foreshortening of the shaft resulting from twist, which because of the diameter and length of the shaft is an effect of such low order as to have a negligible effect on the operation of this device and the flanges may be considered to maintain a fixed distance from each other during operation. Thus, when relative angular displacement takes place between such sleeves and their respective flanges from the torque developed in the shaft 10, the respective cooperating aligned slots 22 in the flanges 16 and the respective end portions 19 of springs 18 which are retained in such slots are also displaced angularly a corresponding amount, and such end portions 19 are no longer in the same plane.

This relative angular motion between the end portions 19 of each of the springs causes a torsional flexure in the springs 18 and a bending in a direction perpendicular to the axis of the shaft resulting in a lateral displacement of the ring 17. Thus a rectilinear motion of the midportions 21 of the springs and a corresponding motion of ring 17 supported thereon results from the relative angular displacement of the flanges 16.

Thus, if a clockwise torsional moment is applied to shaft 10 as shown by the arrows when viewed from the right end of Figs. 1 and 4, the torque so developed in shaft 10 causes relative angular displacement of flanges 16 in the direction indicated by the vertical arrows in Fig. 5, and hence relative displacement of the end portions 19 of the springs 18 to the dotted line position shown in Fig. 5. This produces flexure and twist of the springs, with the right hand intermediate portions 20 thereof moving to the dotted line position shown in Fig. 5 and assuming an angle greater than 45 degrees to the plane of 19 and the left hand intermediate portions 20 assuming an angle smaller than 45 degrees to said plane. The result is that the midportions 21 of the springs are urged laterally to the right as indicated by the horizontal arrow in Fig. 5 to the dotted line position therein, causing the same lateral motion of ring 17. Due principally to the above described structure of springs 18, for small angles of shaft twist up to one or two degrees which are normally encountered, the axial or lateral motion of ring 17 will be practically a linear function of the angular twist.

If a counterclockwise torque is applied to shaft 10 as viewed from the right end of Figs. 1 and 4, the relative angular displacement of flanges 16 is opposite to that indicated in Fig. 5, producing through flexure and twist of the springs 18 in the manner described above, a lateral displacement of the midportions 21 of the springs to the left as viewed in Fig. 5, and causing the same lateral motion of ring 17.

Press fitted about the outer periphery of each of flanges 16 is a cylindrical pole piece 28. The inner ends of the pole pieces are spaced from each other, and a cylindrical armature 30 is press fitted to the outer surface of ring 17 in the space between the inner ends of pole pieces 28, leaving a small circumferential space or air gap 31 between each of the inner ends of such pole pieces and the adjacent face of armature 30.

Pole pieces 28 and armature 30 are constructed of a material having high magnetic permeability and low hysteresis such as soft iron or other suitable magnetizable material, and the pole pieces and armature 30 rotate with sleeves 15 and flanges 16 on rotation of shaft 10. It will be seen that when the shaft 10 is subjected to a torsional moment, whether or not the shaft rotates pole pieces 28 remain axially fixed on flanges 16 while the armature moves axially with the ring 17 in response to axial motion of the latter as described above. This axial movement of the armature 30 relative to the inner ends of pole pieces 28 changes the length of the respective air gaps 31. Preferably, in order to maintain linearity of response the change in length of each of the air gaps should be a small portion, for example, up to about ⅓ of the length of the gaps, and preferably movement of armature 30 should not be sufficiently great to cause the armature to make physical contact with the inner ends of pole pieces 28.

Shaft 10 carrying the sleeves 15 is mounted for rotation in bearings 33 disposed adjacent the outer ends of the sleeves in bearing holders 34. An annular plate 35 is fastened by bolts 36 to the outer faces of each of bearing holders 34, and a ring member 37 is disposed about the inner face of each bearing holder 34 and in contact with the outer face of each bearing 33, such ring members being held against outward axial movement by snap rings 38 inserted in the bearing holders. Ring members 37 abutting bearings 33 prevent outward axial movement of the bearings which in turn hold shaft 10 against lateral or axial displacement by abutting shoulders 39 on an intermediate portion of each of the sleeves 15.

Each of ring members 37 has a flange 43 adjacent snap ring 38, which flange extends normal to and inwardly toward the axis of shaft 10, the ends of such flanges being spaced from the adjacent end portions or sleeves 15. Abutting the outer ends of each of sleeves 15 and fixed for rotation on shaft 10 is a short sleeve member 44 having a flange 45 at one end and a flange 47 at its other inner end, the outer end of flange 45 being spaced from the inner face of plate 35 to form an outlet 46 for a purpose noted below. Flange 47 of each of members 44 extends parallel to flange 45 and to flange 43 of ring 37, outwardly from the axis of shaft 10, there being a small space between the end of flange 47 and the inner face of bearing holder 34. It is apparent that flanges 43, 47, 45 and plate 35 define a circuitous passage from bearings 33 to the outlet 46 between plate 35 and flange 45 for a purpose also hereinafter pointed out.

Attached by bolts 50 and pins 51 between the inner faces of the opposing bearing holders 34 is a laterally extending frame member 52, the pins being employed for ease of assembly. In the outer end walls of frame member 52 are positioned a pair of inlet pipes 53. To provide lubrication for bearings 33, an air-oil mist is forced under a small positive pressure through pipes 53 into the inner spaces 54 of the device, through bearings 33 and thence through the above noted circuitous passage to outlet 46, from which the air-oil mist is vented. The circuitous passages from the bearings to outlets 46 prevent the introduction of dust and dirt into the bearings through opening 46, especially when the device is not in use.

A cylindrical E core 58 made of material similar in magnetic character to 28 and 30 is disposed centrally about the inner periphery of frame member 52 adjacent pole pieces 28 and armature 30. The E core is held in place against axial movement by means of a lug 59 at one end of the core and a snap ring 60 at the other end thereof. Disposed in two annular parallel recesses 61 of the E core formed by the two outer arms 62 and the adjacent inner arms 63 of the core, is a pair of inductance coils 64 held in place by the lips 65 at the ends of these arms. The inner ends of arms 62 are spaced radially from the pole pieces 28 and the inner ends of arms 63 are spaced from the armature 30. This structure defines a pair of air gaps 66 between the ends of the outer arms 62 of the E core and the adjacent faces of the pole pieces 28, and an air gap 67 between the inner arms 63 of the E core and armature 30. The two inductance coils 64 are electrically connected through a connector 68 into a conventional A. C. bridge circuit (not shown) or other indicating device to provide an indication of the relative changes in the inductance of the coils which is a measure of the torque applied to shaft 10.

Current in the inductance coils 64 sets up flux paths starting in the outer arms 62 of the E core 58, crossing auxiliary air gaps 66 to the two pole pieces 28, traversing the measuring air gaps 31 to the armature 30, and then returning across the center auxiliary air gap 67 to the inner arms 63 of the E core. Due to the non-magnetic character of the flanges 16 and the springs 18, the flux path is concentrated to pass through the air gaps 31 and substantially no leakage flux passes through sleeves 15 and shaft 10. The radial spacing of the two auxiliary air gaps 66 and the auxiliary air gap 67 remain constant in length at all times while the measuring air gaps 31 will change in length if the armature is moved in an axial direction, as previously described, one gap increasing in length while the other gap 31 is decreasing.

If the measuring gaps 31 are initially equal in length and the inductances of the two coils 64 are equal, then the bridge circuit will be balanced although such balance could be obtained by an arbitrary choice of the relative lengths of the gaps when no twist is imposed or any arbitrary choice of the relative initial inductances of the coils. As the armature 30 moves axially to reduce the length of one of the gaps 31 and increase that of the other gap 31, one inductance decreases in value while the other increases, unbalancing the bridge. Indication of the degree of unbalance may be obtained by the use of any one of a number of commercial indicators or recording instruments designed for use with A. C. bridge circuits if a bridge is employed.

In operation shaft 10 of the invention device is coupled to the rotating machinery, the torque of which is to be measured. Assuming that a clockwise torsional moment is applied to shaft 10 as viewed from the right end of Figs. 1 and 4, as torque is applied to the shaft, a proportional angular twisting occurs in the neck portion 12 thereof and this angular motion is transmitted to the respective sleeves 15 carrying the flanges 16. Such angular motion causes the springs 18 to flex in the manner described above to thus produce axial movement of the midportions 21 of the springs, ring 17 and armature 30 supported thereon to the right as shown in Fig. 5. In this manner, sleeves 15 and their associated structure convert angular twisting of the shaft into an axial or rectilinear motion which is transmitted to armature 30, the axial motion of the armature thus being proportional to the torque.

As armature 30 is accordingly displaced to the right, as viewed in Figs. 1 and 4, the length of the right air gap 31 decreases while the length of the left air gap 31 increases. This decreases the reluctance and correspondingly increases the inductance of the right coil 64 while decreasing the inductance of the left coil 64. The resulting unbalance of the bridge is proportional to the difference in length between the respective air gaps 31 and to the axial displacement of armature 30 and midportions 21 of springs 18; and hence such unbalance is also proportional to the torque developed in shaft 10 and provides a measure of such torque.

If shaft 10 is subjected to a force producing a counterclockwise torsional moment in the shaft as viewed from the right in Figs. 1 and 4, the torque or twist so developed in the shaft causes axial movement of the midportion 21 of springs 18 to the left as viewed in Fig. 5, with a corresponding axial motion of armature 30 in the same direction. In this manner the length of the left gap 31 decreases while the length of the right gap 31 increases, producing an increase in inductance of the left coil 64 and a decrease in inductance of the right coil 64. This unbalances the bridge and the measure of such unbalance corresponding to the torque developed in shaft 10, as previously explained, is indicated.

Because the adjacent faces of the lips 65 and the pole pieces 28 and armature 30 are parallel and concentric any axial displacement of the shaft 10 has no material effect on the reluctance of the several gaps 66 and 67 and produces no substantial relative change in the inductance of the coils. Consequently no substantial error is introduced into the measurement by such displacement. Since as a practical matter the axial motion of the shaft under rotational load where an end thrust is present cannot be eliminated by use of conventional bearings, the above construction eliminates any substantial error which may be introduced by such axial motion.

From the foregoing, it is seen that the invention provides an improved torquemeter of comparatively simple structure and of compact size. My device will operate efficiently from zero or a very low rotational speed to a very high speed. It is accordingly understood that my device may be used for measuring the torque applied to a shaft where the shaft is not rotating as well as in the case of a rotating shaft. An additional advantage of the invention device is that no slip rings, ordinarily used in torquemeters presently employed, are required. Further, there are no electrical windings on the rotating portion of my device, all electrical windings being on the stator or stationary portion of such device. The torquemeter of the invention is ruggedly constructed and is durable.

While I have described a particular embodiment of my invention for the purpose of illustration, it should be understood that various modifications and adaptations thereof may be made within the spirit of the invention as set forth in the appended claims.

I claim:

1. A torquemeter which comprises a rotatable shaft, a pair of spaced-apart sleeves mounted around said shaft for rotation therewith and being axially fixed with respect thereto, a ring supported between the ends of said sleeves for rotation with said shaft, said ring being axially movable between the ends of said sleeves, a plurality of chordal slots disposed at approximately equal intervals about the periphery of said ring, a plurality of springs connecting said ring with said sleeves, each of said springs being a flat multiply bent spring having its opposite ends fixed to the respective adjacent ends of said sleeves and having a depending mid-portion, the mid-portions of said springs being received within said slots to support said ring for axial movement, said springs urging said ring to move axially when said shaft is subjected to a torque so as to convert the angular displacement of said shaft due to said torque into a rectilinear displacement of said ring proportional to said angular displacement, and means responsive to said rectilinear displacement for measuring said torque.

2. A torquemeter which comprises a rotatable shaft having a neck portion, a pair of spaced-apart sleeves axially fixed about the periphery of said shaft for rotation therewith, flanges on the adjacent ends of said sleeves, a ring normally supported axially of said shaft approximately midway between said flanges, said flanges and said ring being positioned about and spaced from the neck portion of said shaft, said ring being axially movable between said flanges, a plurality of chordal slots disposed at approximately equal intervals about the periphery of said flanges and said ring, the slots in said flanges being oppositely aligned, a plurality of springs connecting said ring with said flanges, each of said springs being a flat multiply bent spring having two end portions normally in the same plane, a pair of inclined intermediate portions disposed at approximately the same angle to the adjacent end portions of said spring and a mid-portion located in a plane parallel to that of said end portions, said intermediate portions each having flanges disposed along their lateral edges, the respective end portions of each of said springs being received in a pair of oppositely aligned mating slots in said first mentioned flanges, each of the slots in said ring being sufficiently offset from the adjacent pair of oppositely aligned slots in said flanges to matingly receive the mid-portion of a spring to support said ring for axial movement, said springs urging said ring to move axially when said shaft is subjected to a torque so as to convert the angular displacement of said shaft due to said torque into a rectilinear displacement of said ring proportional to said angular displacement, and means responsive to said rectilinear displacement for measuring said torque.

3. A torquemeter as defined in claim 2 wherein said last-named means includes an armature fixed to the outer surface of said ring for axial movement therewith, a pair of axially fixed pole pieces connected to said flanges for rotation therewith, said armature and said pole pieces defining a pair of air gaps therebetween which are variable in length in response to axial movement of said armature with respect to said pole pieces, a core having a pair of annular parallel recesses, said core being disposed adjacent and spaced from said pole pieces and armature to form air gaps of fixed length therebetween, an inductance coil mounted in each of said annular recesses to provide a field of magnetic flux passing through said core, said pole pieces and said armature and traversing all of said air gaps, the inductance of said coils varying in response to changes in the lengths of said variable air gaps, electrical means connected to said coils to indicate the variations in the inductance of said coils, and means for converting said inductance variations into a measurement proportional to the changes in lengths of said air gaps and to the rectilinear displacement of said armature and said ring, thereby providing a measure of said torque.

4. A torquemeter which comprises a rotatable shaft, a pair of spaced-apart sleeves mounted around said shaft for rotation therewith and being axially fixed with respect thereto, a ring supported between the ends of said sleeves for rotation with said shaft, said ring being axially movable between the ends of said sleeves, said ring having a plurality of slots disposed at intervals about its periphery, a plurality of springs connecting said ring with said sleeves, each of said springs being a multiply bent spring having its opposite ends fixed to the respective adjacent ends of said sleeves and having an intermediate portion, the intermediate portions of said springs being received within said slots to support said ring for axial movement, said springs urging said ring to move axially when said shaft is subjected to a torque so as to convert the angular displacement of said shaft due to said torque into a rectilinear displacement of said ring proportional to said angular displacement, and means responsive to said rectilinear displacement for measuring said torque.

5. A torquemeter which comprises a rotatable shaft, a pair of spaced-apart sleeves axially fixed about the periphery of said shaft for rotation therewith, flanges on the adjacent ends of said sleeves, a ring normally supported axially of said shaft approximately midway between said flanges, said ring being axially movable between said flanges, said flanges and said ring having a plurality of slots disposed at intervals about their peripheries, the slots in said flanges being oppositely aligned, a plurality of springs connecting said ring with said flanges, each of said springs being a multiply bent spring, each of said springs having two end portions and a mid-portion displaced from said end portions, the respective end portions of each of said springs being received in a pair of opposite slots in said flanges, each of the slots in said ring being sufficiently offset from the adjacent pair of oppositely aligned slots in said flanges to matingly receive the mid-portion of a spring to support said ring for axial movement, said springs urging said ring to move axially when said shaft is subjected to a torque so as to convert the angular displacement of said shaft due to said torque into a rectilinear displacement of said ring proportional to said angular displacement, and means responsive to said rectilinear displacement for measuring said torque.

6. A torquemeter which comprises a shaft, a pair of spaced-apart sleeves mounted around said shaft for angular movement therewith and being axially fixed with respect thereto, an element supported between the ends of said sleeves, said element being axially movable between the ends of said sleeves, a plurality of springs connecting said element with said sleeves, each of said springs being a flat multiply bent spring having two end portions normally in the same plane, a pair of inclined intermediate portions disposed at approximately the same angle to the adjacent end portions of said spring, flanges along the outer edges of each of said intermediate portions, and a mid-portion located in a plane parallel to that of said end portions, said element being supported for axial movement on the mid-portions of said springs, said springs urging said element to move axially when a torque is developed in said shaft so as to convert the angular displacement of said shaft due to said torque into a rectilinear displacement of said element proportional to said angular displacement, and means responsive to said rectilinear displacement for measuring said torque.

References Cited in the file of this patent
UNITED STATES PATENTS

| | | |
|---|---|---|
| 2,260,036 | Kuehni | Oct. 21, 1941 |
| 2,432,900 | Jacobsen | Dec. 16, 1947 |